United States Patent
Norimatsu

(10) Patent No.: US 7,264,547 B1
(45) Date of Patent: Sep. 4, 2007

(54) GAME APPARATUS, GAME IMAGE PREPARATION METHOD AND INFORMATION STORAGE MEDIUM

(75) Inventor: Satoshi Norimatsu, Tokyo (JP)

(73) Assignee: Namco Ltd., Tokyo (JP)

( * ) Notice: Subject to any disclaimer, the term of this patent is extended or adjusted under 35 U.S.C. 154(b) by 197 days.

(21) Appl. No.: 09/650,258

(22) Filed: Aug. 29, 2000

(30) Foreign Application Priority Data

Sep. 9, 1999 (JP) ................................. 11-256416

(51) Int. Cl.
A63F 13/10 (2006.01)

(52) U.S. Cl. ...................................................... 463/31

(58) Field of Classification Search .................... 463/1, 463/30–34, 40–43; 273/148 A, 459–461; 345/418–419, 428–429, 473–475, 113–114, 345/121, 133, 949–953
See application file for complete search history.

(56) References Cited

U.S. PATENT DOCUMENTS

| | | | | |
|---|---|---|---|---|
| 5,191,642 A | * | 3/1993 | Quick et al. ................. 345/418 |
| 5,269,687 A | * | 12/1993 | Mott et al. .................. 273/454 |
| 5,779,548 A | * | 7/1998 | Asai et al. ....................... 463/1 |
| 5,830,066 A | * | 11/1998 | Goden et al. .................. 463/33 |
| 6,010,405 A | * | 1/2000 | Morawiec .................... 345/501 |
| 6,017,272 A | * | 1/2000 | Rieder .......................... 463/31 |
| 6,139,434 A | * | 10/2000 | Miyamoto et al. .......... 345/419 |
| 6,217,446 B1 | * | 4/2001 | Sanbongi et al. ........... 345/419 |
| 6,227,973 B1 | * | 5/2001 | Kikuchi .................... 273/108.2 |
| 6,283,857 B1 | * | 9/2001 | Miyamoto et al. ............ 463/31 |
| 6,331,146 B1 | * | 12/2001 | Miyamoto et al. ............ 463/32 |
| 6,364,770 B1 | * | 4/2002 | Maruyama ................... 345/629 |
| 6,392,644 B1 | * | 5/2002 | Miyata et al. ............... 345/419 |
| 6,409,596 B1 | * | 6/2002 | Hayashida et al. ........... 463/31 |
| 6,409,597 B1 | * | 6/2002 | Mizumoto .................... 463/31 |
| 6,417,856 B1 | * | 7/2002 | Tamura et al. .............. 345/474 |

FOREIGN PATENT DOCUMENTS

JP        10-179937        7/1998

* cited by examiner

*Primary Examiner*—Scott Jones
(74) *Attorney, Agent, or Firm*—patenttm.us; James H. Walters

(57) ABSTRACT

There are disclosed a game apparatus, game image preparation method and information storage medium that when a player character moves in a three-dimensional game space, sets a plurality of viewpoints in the field of view in which this character is included and prepares a plurality of two-dimensional images with different contents corresponding to their respective viewpoints.

11 Claims, 10 Drawing Sheets

GAME APPARATUS, GAME IMAGE PREPARATION METHOD AND INFORMATION STORAGE MEDIUM

BACKGROUND OF THE INVENTION

The present invention relates to a game apparatus, a game image preparation method and an information storage medium for games whose story branches as the game advances.

A game in which a character manipulated by a player (hereinafter referred to as "player character") moves around in the game space, which is a virtual three-dimensional space, and clears a number of events that occur in the meantime is conventionally known. This kind of game is generally called an "action game," and there is a predetermined course, which the player character follows, and various events occur while the player character is tracing the provided course. Moreover, a various ideas are often implemented so that when the player plays this game repeatedly the player can enjoy the game each time by introducing branches to this course and making the content of the game more complicated. For this purpose, each branched course is provided with three-dimensional objects with the greatest possible variations.

Moreover, recently, with increasingly faster processors, etc., techniques of expressing the game space using polygon graphics are generally used. In this case, each three-dimensional object in the game space is configured by polygons and these polygons are accompanied by textures, etc. as the occasion demands. While the player character is following a predetermined course, the viewpoint corresponding to the player also moves simultaneously. Perspective projection conversion is performed based on this viewpoint at a constant time interval (for example, ¹⁄₆₀-second interval), creating a two-dimensional image to be displayed on the display screen.

While it is possible to obtain a more realistic two-dimensional image by creating a game image using the technique of polygon graphics, making complicated figures appear more natural using polygons requires many polygons and textures for each three-dimensional object, thus producing a problem of requiring enormous effort to create data for background scene of the player character. Especially, when there are branches in the story of the game, it is necessary to provide a game space that varies from one course to another at the branch destination, which makes it necessary to create data for background that varies from one course to another and creating the data for background scene requires further effort.

SUMMARY OF THE INVENTION

The present invention has been achieved by taking into account the points described above and it is an object of the present invention to provide a game apparatus, game image preparation method and information storage medium capable of reducing effort required to create data for background.

In order to solve the above described problem, the game apparatus and game image preparation method of the present invention sets a plurality of viewpoints by viewpoint setting unit at the time of moving the character corresponding to the player along a predetermined course set in the three-dimensional game space and selectively prepares two-dimensional images corresponding to their plurality of viewpoints by image preparing unit. Even if the course of the player character is the same, changing the viewpoint can change backgrounds included in the field of view corresponding to their respective viewpoints a great deal, making it possible to make the player character appear moving in different courses. This makes it possible to reduce the number of game spaces corresponding to the data for background to be created and reduce effort necessary to create the data for background.

Furthermore, it is desirable to store image data necessary to prepare two-dimensional images corresponding to the above described plurality of viewpoints in image data storing unit and make the image preparing unit prepare two-dimensional images based on this stored image data. Even if two-dimensional images of two or more types with different contents are created, the image data storing unit can store image data corresponding to the same game space, making it possible to reduce the capacity of the image data storing unit. In the case where image data recorded in CD-ROM, etc. is read and stored in the image data storing unit, the number of times the data is stored can be reduced, which makes it possible to shorten a game interruption time necessary to load enormous image data.

Furthermore, it is desirable to change scenes by switching the above described viewpoints and discretely changing the contents of two-dimensional images prepared by the image preparing unit. Because the scenes can be changed by switching viewpoints, there is no need to read various kinds of data making up each three-dimensional object included in a three-dimensional game space and makes it possible to shorten the time necessary to change scenes.

Especially, in the case when the story branches are generated when the character is moved, it is desirable to switch viewpoints according to the story branch. Normally, when a game story branches, it is necessary to prepare a background, etc. with a wide variety corresponding to the story at each destination on branch, and therefore switching viewpoints according to this branch timing saves the time required to prepare a game space for each branched story.

Furthermore, it is desirable to differentiate three-dimensional objects included in the field of view corresponding to a plurality of viewpoints. Changing a background for the player character a great deal by only switching viewpoints requires also the content of the three-dimensional objects placed there to be changed. On the contrary, differentiating three-dimensional objects included in the background corresponding to their respective viewpoints makes it possible to prepare two-dimensional images with completely different backgrounds even in the same three-dimensional game space.

Moreover, when the character is moved, it is desirable to generate different events according to a plurality of viewpoints by game directing unit. Changing viewpoints makes it possible to change a background of the player character and furthermore changing events generated for every viewpoint makes it possible to implement story contents that totally vary from one viewpoint to another.

Furthermore, it is desirable for each event generated by the above described game directing unit to change the level of difficulty for every different viewpoint. Providing stories with the level of difficulty varying from one viewpoint to another makes it easier to give variations to the game content.

Furthermore, the information storage medium of the present invention not only moves a player character in a predetermined course set in a three-dimensional space but also includes a program to set a plurality of viewpoints in the field of view in which the character is included and a program to prepare two-dimensional images corresponding to a plurality of viewpoints. By executing these programs stored in the information storage medium, it is possible to drastically change backgrounds included in the field of view corresponding to each viewpoint even if the player character traces the same course and make the player character appear moving in other courses, which makes it possible to reduce the number of game spaces for which data for background is to be created and reduce effort required to create the data for background.

DESCRIPTION OF THE PREFERRED EMBODIMENTS

With reference now to the attached drawings, an embodiment of the present invention will be explained in detail below.

Figure 1:
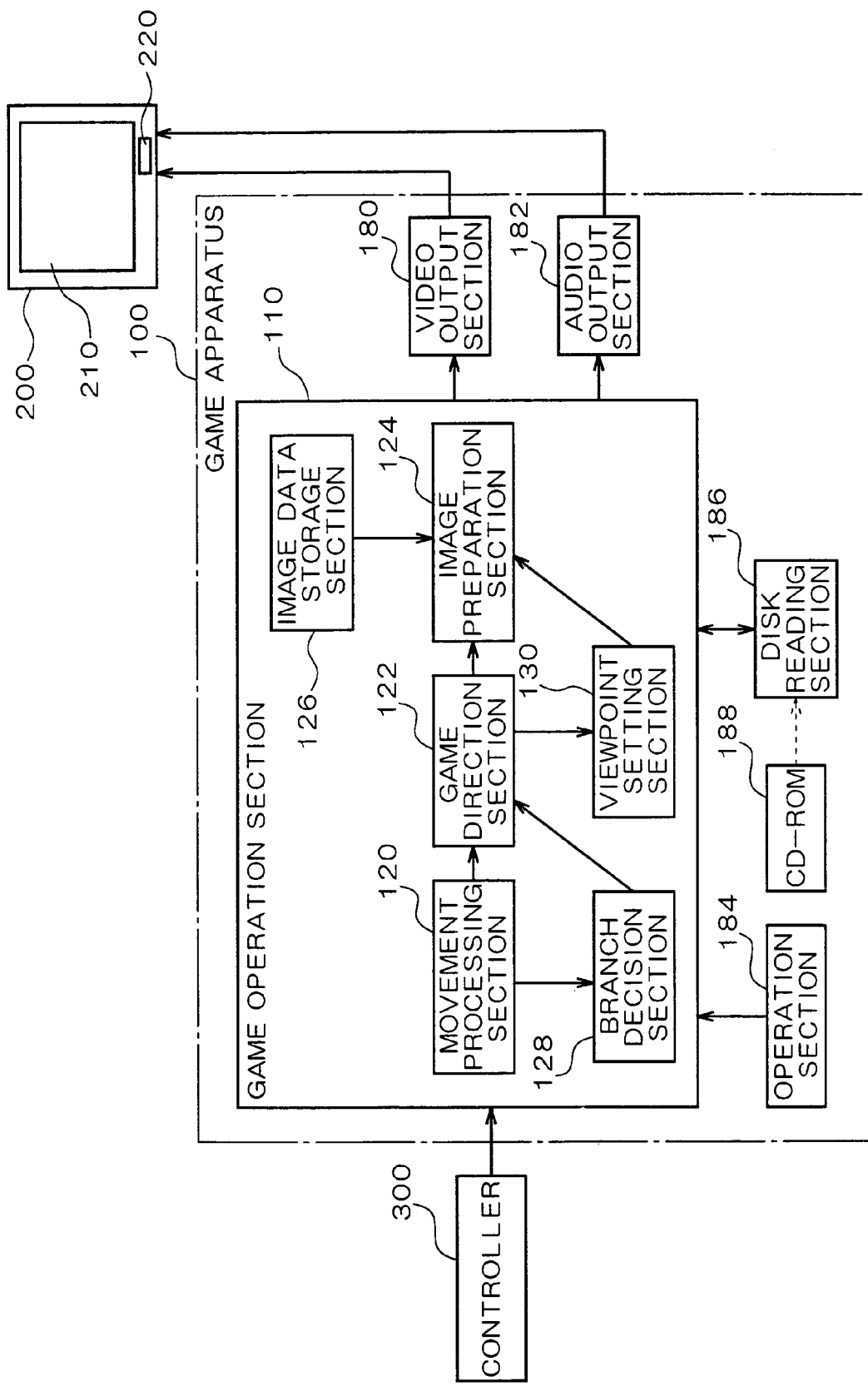
FIG. 1 is a block diagram showing a configuration of a game apparatus according to an embodiment.
Figure 2:
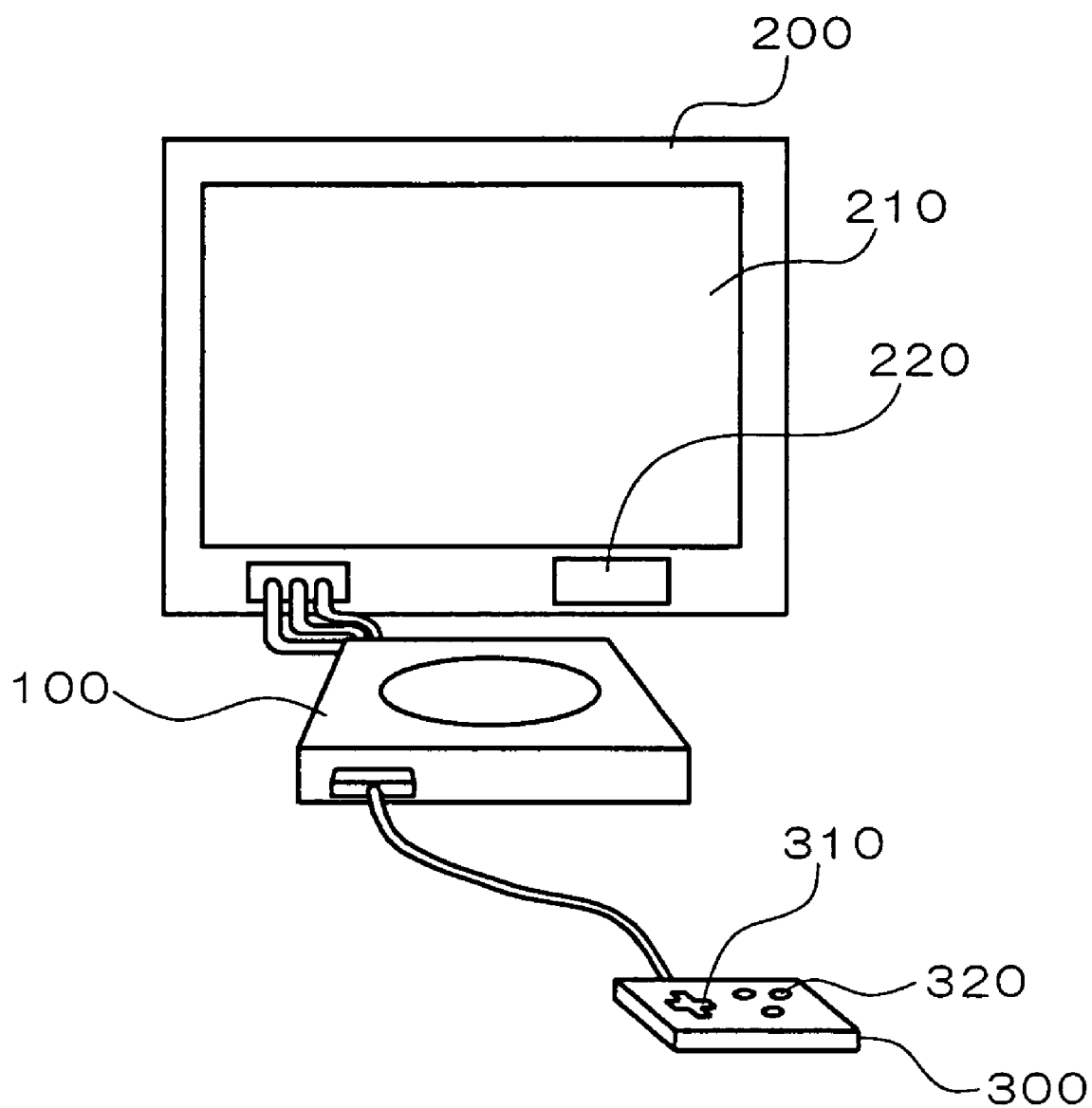
FIG. 2 is a diagram showing how the game apparatus of this embodiment is connected to peripheral devices.

FIG. 1 is a block diagram showing a configuration of the game apparatus according to this embodiment. FIG. 2 illustrates how the game apparatus of this embodiment is connected to peripheral devices. This embodiment will explain a game apparatus for home use as an example.

As shown in FIG. 1 and FIG. 2, the game apparatus of this embodiment is configured by a game apparatus 100 that performs predetermined game operations by executing a game program stored in a CD-ROM as an information storage medium and outputs image signals of game images and voice signals such as various effect sounds, a TV monitor apparatus 200 connected to this game apparatus 100 and a controller 300 that the player operates at hand.

The TV monitor apparatus 200 is equipped with a display section 210 that displays a game image on a display screen based on an image signal input from the game apparatus 100 and a speaker 220 that converts a voice signal input from the game apparatus 100 to voice and emits it into the air. The display section 210 is configured, for example, by a CRT (cathode ray tube), LCD (liquid crystal display) or LCD projector, etc. The controller 300 is provided with a cross key 310 that can arbitrarily point 8 directions and a plurality of button switches 320 that are selectively pressed as required.

The game apparatus 100 is provided with a game operation section 110, a video output section 180, an audio output section 182, an operation section 184 and a disk reading section 186. The game operation section 110 performs various game operations by executing a game program using, for example, a CPU, ROM and RAM. A detailed configuration of this game operation section 110 will be explained later.

The video output section 180 is configured by including a VRAM and reads image data, which is generated by the game operation section 110 and stored in the VRAM in order of scanning, converts the image data to an NTSC signal and outputs a video signal to the display section 210 of the TV monitor apparatus 200. The audio output section 182 converts various voice data output from the game operation section 110 to an analog voice signal and outputs the analog voice signal to the speaker 220 included in the TV monitor apparatus 200.

The operation section 184 is for the player to input various commands to the game apparatus 100. Most operations are carried out using the controller 300, which is externally connected to the game apparatus 100, and therefore suppose, for example, a power switch and reset switch, etc. in this embodiment are included in the operation section 184.

The disk reading section 186 is used to read various data stored in the CD-ROM 188 inserted. The CD-ROM 188 stores a game program including image data necessary to provide high-resolution graphic display and the disk reading section 186 sends the game program read from the CD-ROM 188 to the game operation section 110.

On the other hand, the game operation section 110 is configured by including a movement processing section 120, a game direction section 122, an image preparation section 124, an image data storage section 126, a branch decision section 128 and viewpoint setting section 130.

The movement processing section 120 performs processing of moving a player character appearing on the stage of the game in a predetermined course. For example, suppose an action game in which the player character moves in a predetermined course as the game story develops.

The game direction section 122 directs the game by generating various events at specific points when the player character is moved in the predetermined course by the movement processing section 120. For example, the game direction section 122 lets an enemy character appear, attack the player character, causes damage to the player character according to the result or lets an item appear and adds up points when this item is gained by the player character, and so on. Furthermore, the game direction section 122 calculates locations and orientations, etc. of the player character and surrounding enemy characters and various three-dimensional objects such as items at a predetermined time interval. This calculation is performed, for example, every $1/60$ second, which is a display interval of 1 field of the general TV monitor apparatus 200 which performs interlace scanning.

The image preparation section 124 reads detailed data (image data) of various three-dimensional objects whose location and orientation are calculated by the game direction section 122 from the image data storage section 126, performs perspective projection conversion based on the viewpoint corresponding to the player and generates a two-dimensional image as a pseudo three-dimensional image. Image data read from the image data storage section 126 includes polygon data making up various three-dimensional objects such as the player character, enemy characters or mountains and buildings as a background, and texture data pasted to these polygons. Moreover, not all objects included in the background need to be three-dimensional objects made up of polygons and a far-off landscape and sky, etc. can also be expressed with two-dimensional image data.

The branch decision section 128 decides whether the story is branched or not when the movement processing section 120 moves the player character in a predetermined course. If there is a branch, this information is sent to the game direction section 122. Upon receipt of this information, the game direction section 122 performs predetermined game direction according to the type of the branch. For example, the branch destination is automatically decided if the setting is made so that the branch destination is decided by the records so far (points gained or amount of damage). Or if the setting is made so that the branch destination is decided by the player pressing the cross key 310 or operating button switches 320 of the controller 300 at appropriate timing, it is decided whether this cross key 310, etc. is operated at predetermined timing or not and the branch destination is decided based on that result.

The viewpoint setting section 130 changes the viewpoint setting according to a viewpoint switching command from the game direction section 122. This embodiment allows a plurality of viewpoints to be set in the same course and which of these viewpoints should be selected is decided according to the viewpoint switching command sent from the game direction section 122. A specific example of viewpoint setting will be described later.

The above described movement processing section 120 corresponds to the movement processing unit; the viewpoint setting section 130 corresponds to the viewpoint setting unit; the image preparation section 124 corresponds to the image preparing unit; and the game direction section 122 corresponds to the game directing unit. Moreover, the game direction section 122 corresponds to the viewpoint switching unit; the image data storage section 126 corresponds to the image data storing unit; and the branch decision section 128 corresponds to the branch deciding unit.

Figure 3:
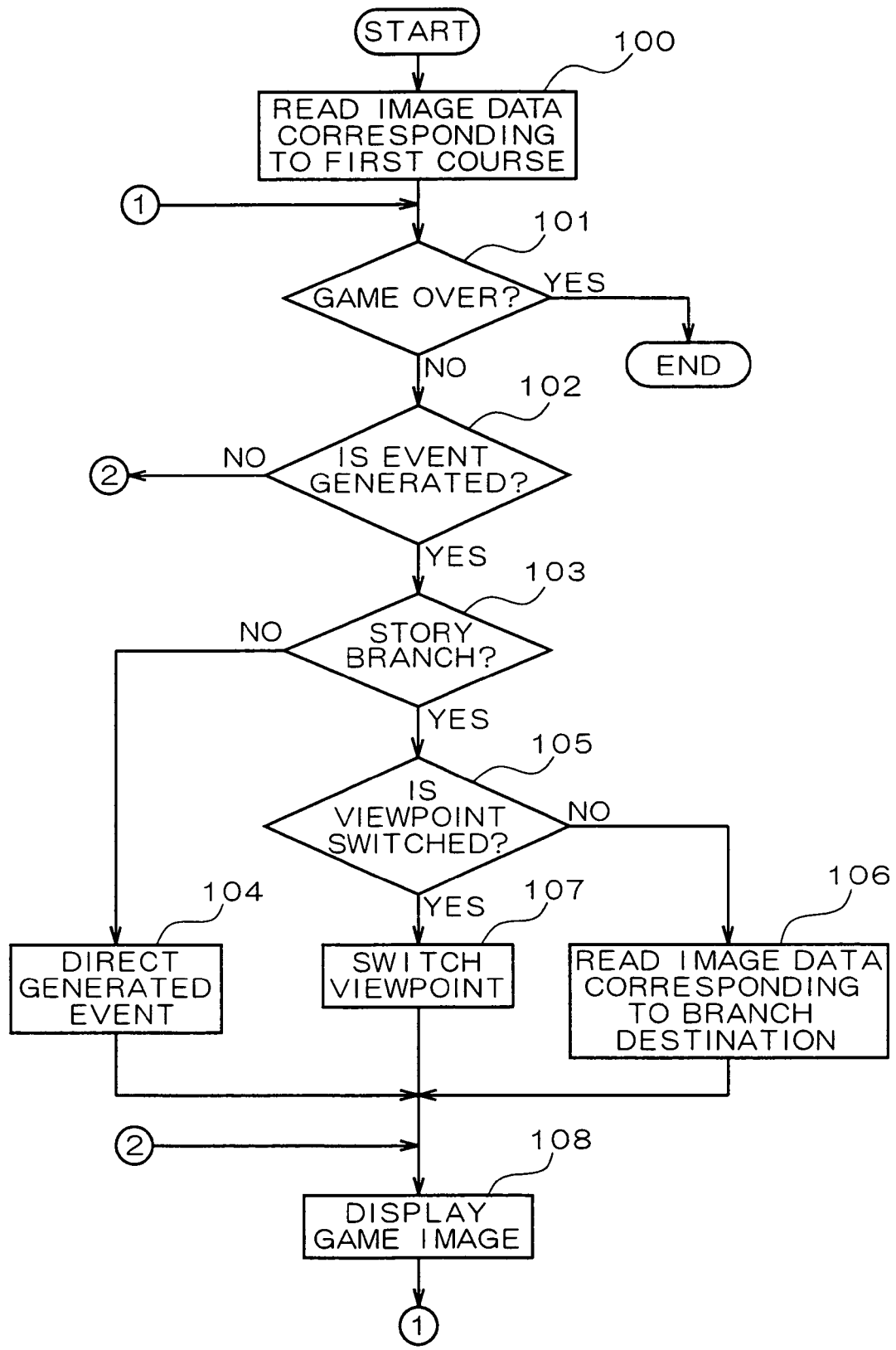
FIG. 3 is a flow chart showing an operation procedure of the game apparatus of this embodiment.

The game apparatus of this embodiment has a configuration as described above and its operation will be explained below. FIG. 3 is a flow chart showing an operation procedure of the game apparatus of this embodiment. When the power switch or reset switch of the operation section 184 is pressed, the game operation section 110 starts a game operation, sends a command to the disk reading section 186 to read the image data corresponding to a first course and stores the read image data in the image data storage section 126 (step 100). Then, the subsequent processing is repeated until a game over (step 101). A game over condition varies from one game to another. For example, a game over takes place when the player fails to clear each stage within a predetermined time or the player character receives a predetermined amount of damage from enemy characters, etc.

Then, the game direction section 122 decides whether or not to generate an event (step 102). Since event generation positions are predetermined, it is possible to know the timing for generating an event by checking how far the movement processing section 120 moves the player character. In the case where it is not the timing for generating an event, a negative decision is made in step 102 and the game direction section 122 then calculates locations and orientations, etc. of the player character, surrounding enemy characters and various three-dimensional objects such as items. Then, the image preparation section 124 reads image data of various three-dimensional objects whose location, etc. is calculated by the game direction section 122 from the image data storage section 126, performs perspective projection conversion based on the viewpoint corresponding to the player and generates a two-dimensional image necessary for display. This two-dimensional image data is sent to the video output section 180 and a predetermined game image is displayed on the display screen of the TV monitor apparatus 200 (step 108). After the display operation of this game image is completed, the process goes back to step 101 and a decision as to whether the game is over or not is repeated.

Moreover, in case of timing for generating an event, an affirmative decision is made in step 102 described above, and then the game direction section 122 decides whether this event generated is a story branch or not (step 103). For example, this embodiment assumes that the processing for branching the story is also included as one of events performed by the game direction section 122. In the case where the branch decision section 128 does not detect any branch in the story, the game direction section 122 makes a negative decision in step 103 and performs game direction about the event generated other than a branch (step 104). The game direction section 122 makes enemy characters attack the player character while the player character is moving in some course or generates an item to recover the physical power value of the player character. Then, the process moves to step 108 where the game direction section 122 calculates locations of various three-dimensional objects, etc. and displays a game image based on this calculation result.

In the case where the event generated is branch processing of the story, an affirmative decision is made in step 103 above. Then, the game direction section 122 decides whether the viewpoint should be changed or not (step 105). When a story branch is generated, this embodiment provides two cases; this branch processing is performed by simple viewpoint switching or this branch processing is performed by reading the image data corresponding to the course. Specific examples of these will be described later. In the case where the branch processing is performed by reading the image data, a negative decision is made in step 105, then the disk reading section 186 reads the image data corresponding to the course of the branch destination from the CD-ROM 188 and stores the image data in the image data storage section 126 (step 106). Then, the process moves to step 108 where the game direction section 122 calculates locations, etc. of various three-dimensional objects and a game image based on this calculation result is displayed.

On the other hand, in the case where the branch processing is performed by viewpoint switching, an affirmative decision is made in step 105 and the game direction section 122 sends a viewpoint switching command to the viewpoint setting section 130 to switch the viewpoint (step 107). Then, the process moves to step 108 where the game direction section 122 calculates locations, etc. of various three-dimensional objects and a game image based on this calculation result is displayed.

Figure 4:
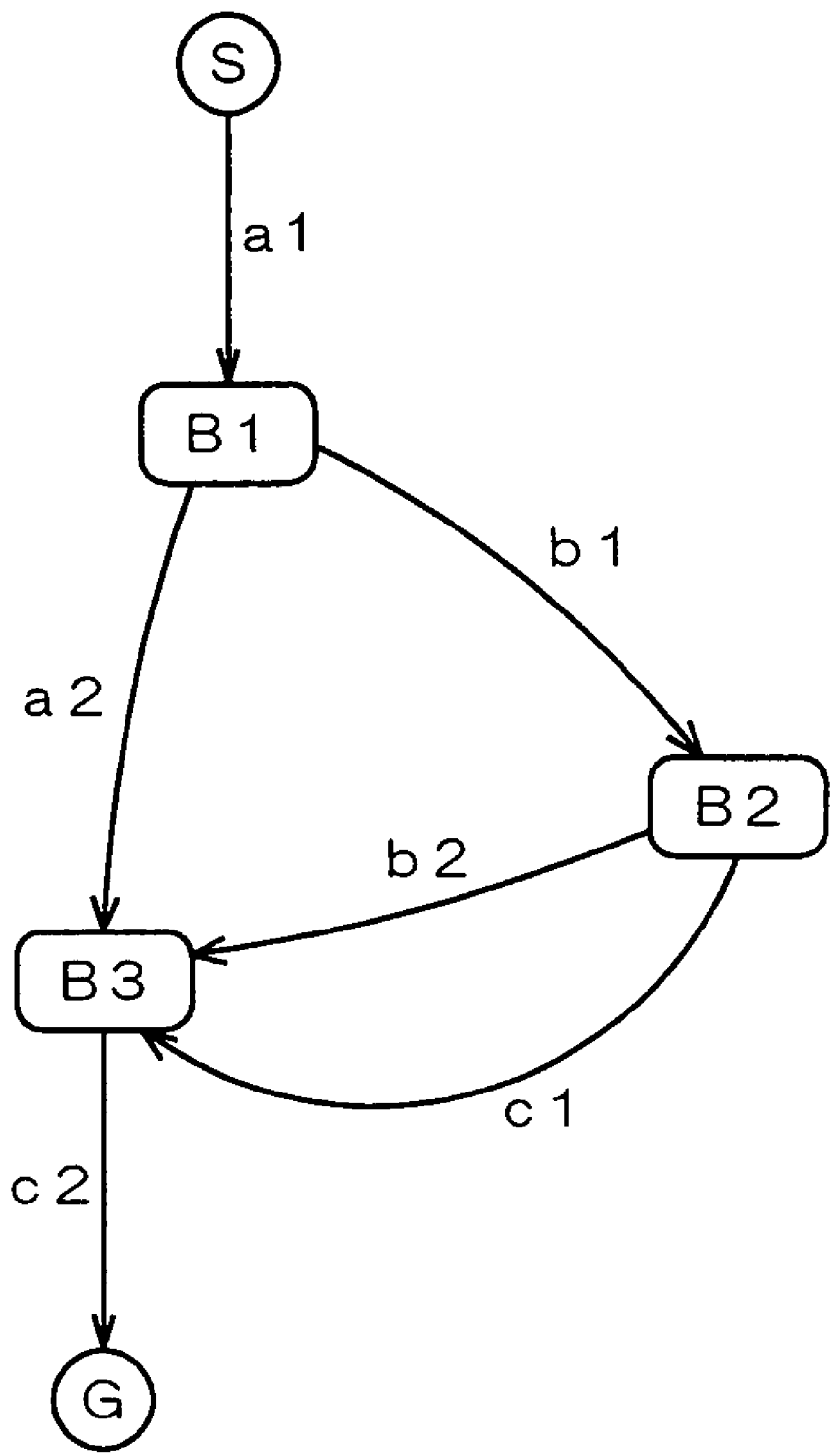
FIG. 4 is a transition diagram of story development executed by the game apparatus of this embodiment.

FIG. 4 is a transition diagram of story development executed by the game apparatus of this embodiment and shows how the story is branched. In FIG. 4, "S" denotes a game start positions; "G," a goal position; "B1" and "B2," story branch points; and "B3," a confluence point of the story. The arrows connecting these positions each indicate a progress state of the story. Story progress is made by either switching the actual course or switching only the viewpoint while following the same course. In the case where the course is actually switched, it is necessary to switch the entire background scene including the course, and therefore it is necessary to read the image data including the data for background corresponding to the selected course from the CD-ROM 188. On the contrary, in the case where only the viewpoint is changed, the viewpoint is simply moved in the same course as that of the story progress so far or in the reverse course and the image data need not be read. In FIG. 4, a1 and a2 correspond to two stories implemented by changing the viewpoints in the same course. Likewise, b1 and b2 correspond to two stories implemented by changing the viewpoints in the same course and c1 and c2 correspond to two stories implemented by changing the viewpoints in the same course.

Figure 5:
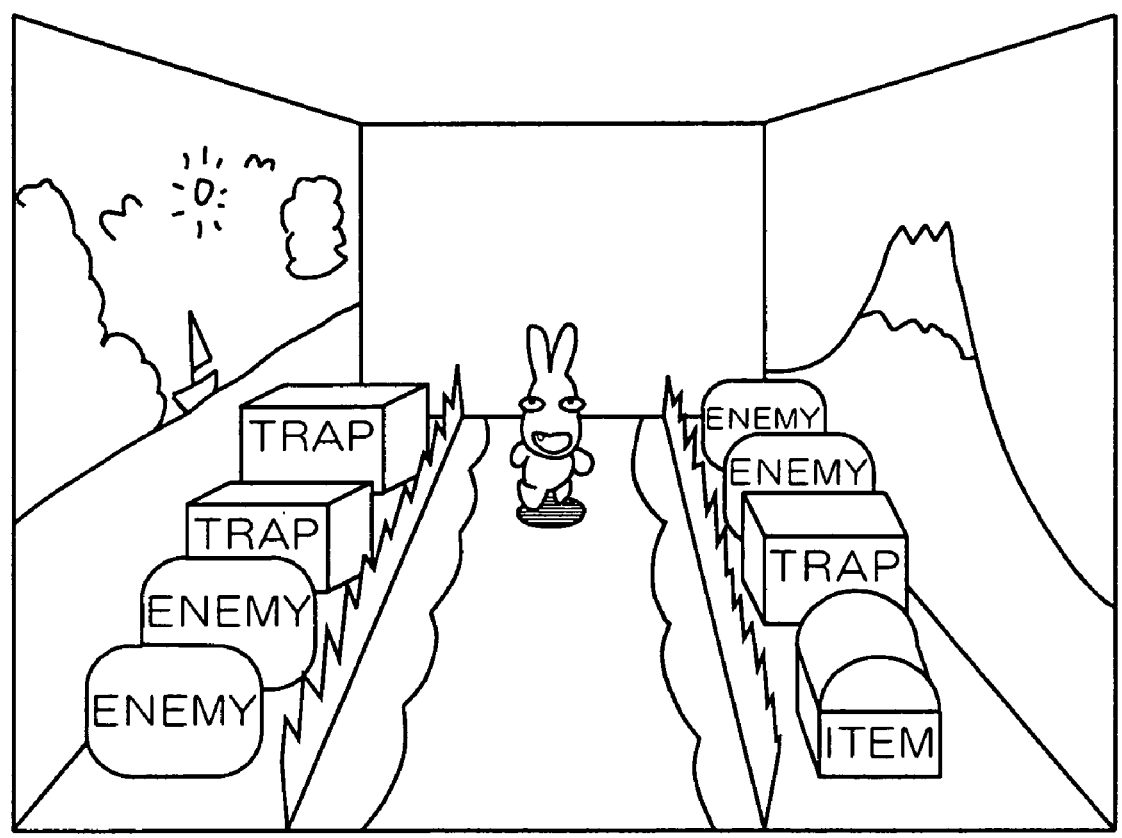
FIG. 5 is a schematic diagram of a game space implemented by switching viewpoints of two stories a1 and a2 shown in FIG. 4.

FIG. 5 shows an outline of the game space implementing the two stories a1 and a2 shown in FIG. 4 by changing the viewpoints. In the game space shown in FIG. 5, suppose the player character is coming from back to front. Three-dimensional objects of enemy characters, a trap and an item and a mountain as a background are placed on the left side of the player character moving on along the course. The mountain as the background can be configured by a three-dimensional object or a two-dimensional object; either case is possible. Furthermore, enemy characters and traps as three-dimensional objects and a sea or sky as a background are placed on the right side of the player character moving on along the course.

Figure 6:
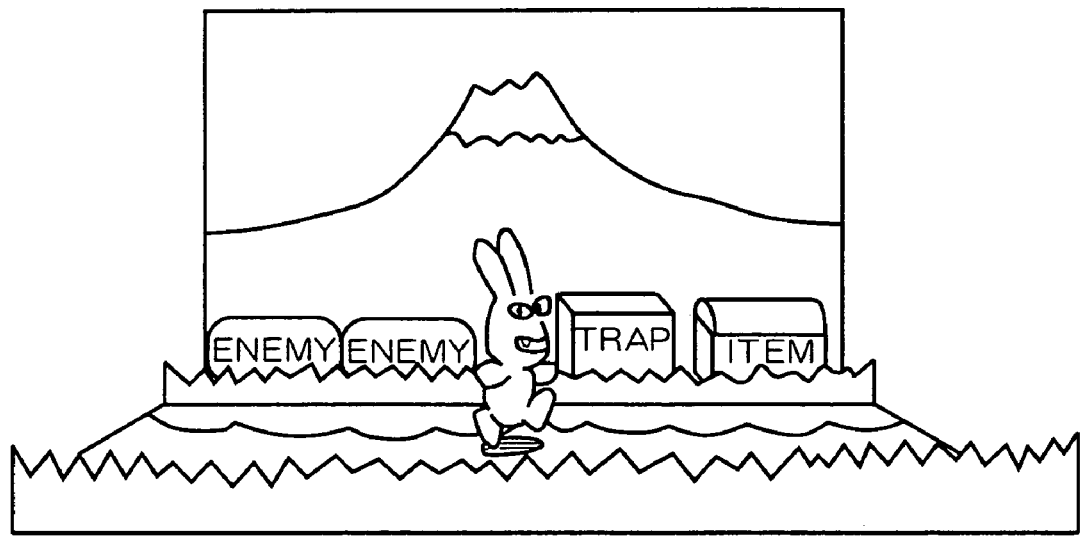
FIG. 6 is a diagram showing a specific example of a two-dimensional image of the game space shown in FIG. 5 viewed from a predetermined viewpoint.

When the game starts, a viewpoint first is set at a predetermined position just to the right of the player character viewed from the player character in the moving direction. Therefore, as shown in FIG. 6, the display screen shows the player character nearly at the center, the enemy characters and trap or item behind the player character and a two-dimensional image of a mountain as a background, and story a1 advances in this way.

Figure 7:
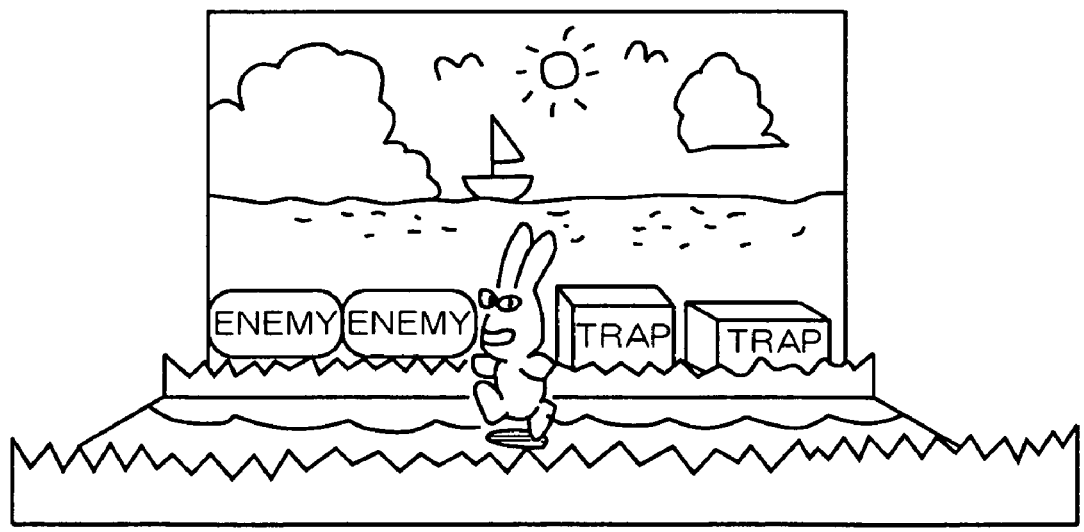
FIG. 7 is a diagram showing a specific example of a two-dimensional image of the game space shown in FIG. 5 viewed from another viewpoint.

Suppose the story advances, reaches branch position B1 and branches to story a2. Then, the viewpoint is changed to a predetermined position just to the left of the player character viewed from the player character in the moving direction. Therefore, as shown in FIG. 7, the display screen shows the player character nearly at the center, the enemy characters and traps behind the player character and a two-dimensional image of the sea and sky as a background, and story a2 advances in this way.

Figure 8:
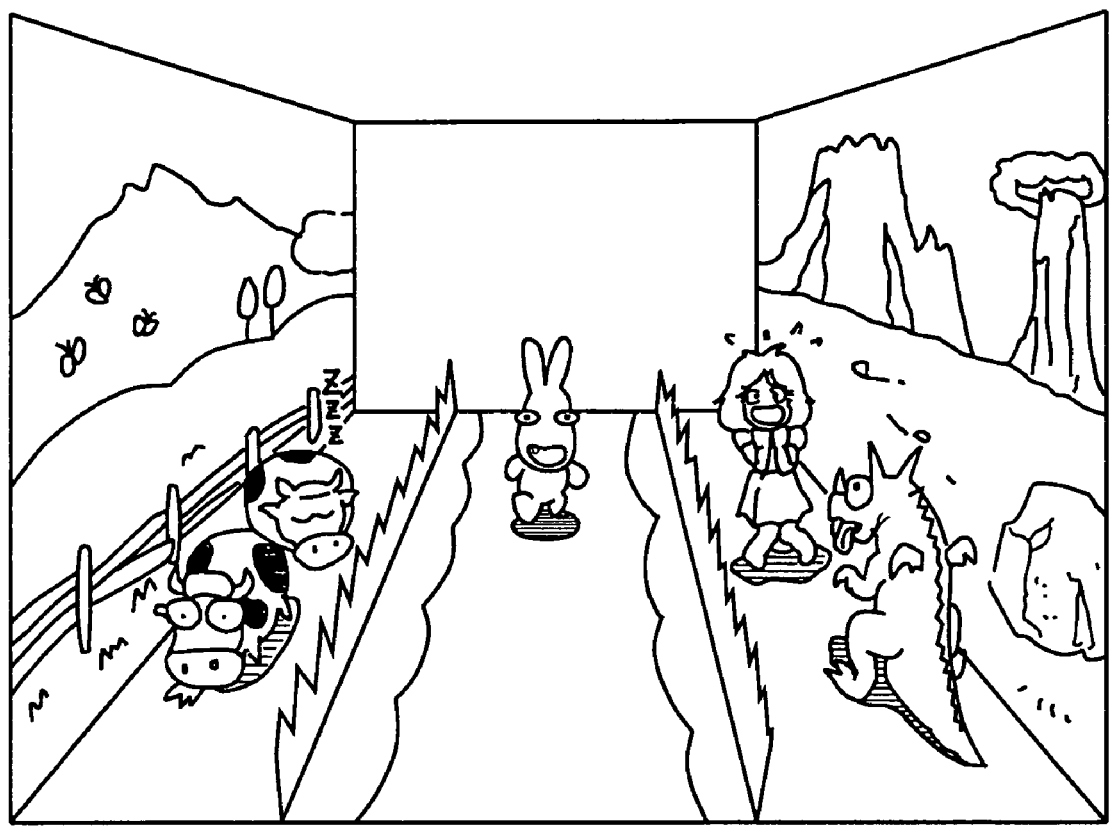
FIG. 8 is a schematic diagram of a game space implemented by switching viewpoints of two stories b1 and b2 shown in FIG. 4.

FIG. 8 shows an outline of the game space implementing two stories b1 and b2 shown in FIG. 4 by changing the viewpoint. In the game space shown in FIG. 8, suppose the player character is moving from back to front. Three-dimensional objects of a girl and a monster that attacks the girl and a wilderness as a background are placed on the left side of the player character moving on along the course. Furthermore, cows as the three-dimensional objects and a pasture and a mountain as a background are placed on the right of the player character moving on along the course.

Figure 9:
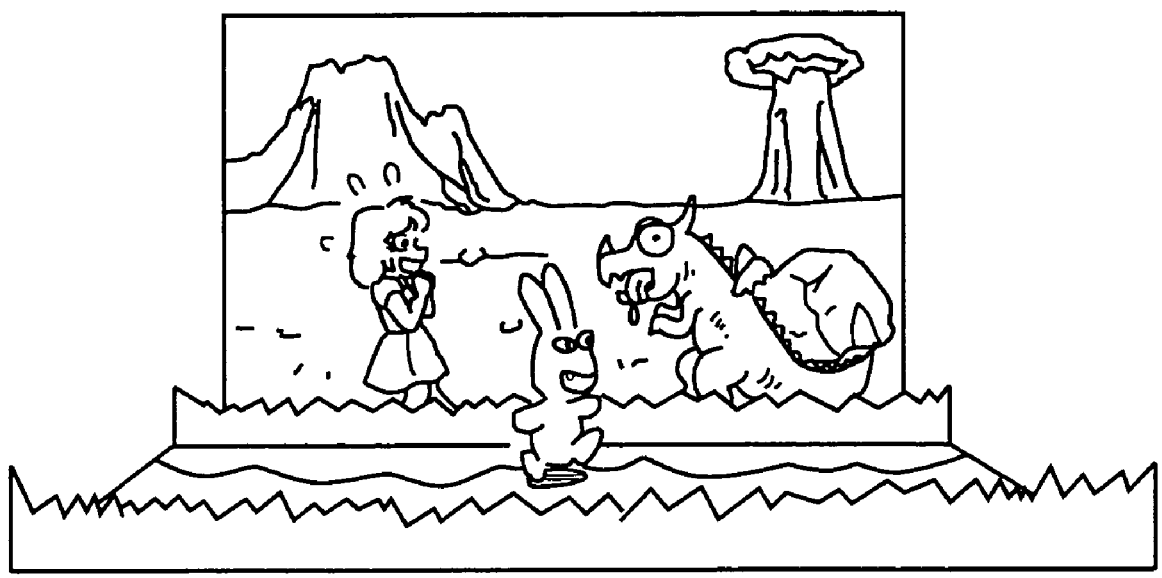
FIG. 9 is a diagram showing a specific example of a two-dimensional image of the game space shown in FIG. 8 viewed from a predetermined viewpoint.

When the story passes through the branch position B1 and moves in the b1 direction, the viewpoint is set at a predetermined position just to the right of the player character viewed from the player character in the moving direction. Thus, as shown in FIG. 9, the display screen shows the player character nearly at the center, the girl and the monster attacking her behind the player character and a two-dimensional image of a wilderness as the background, and story b1 advances.

Figure 10:
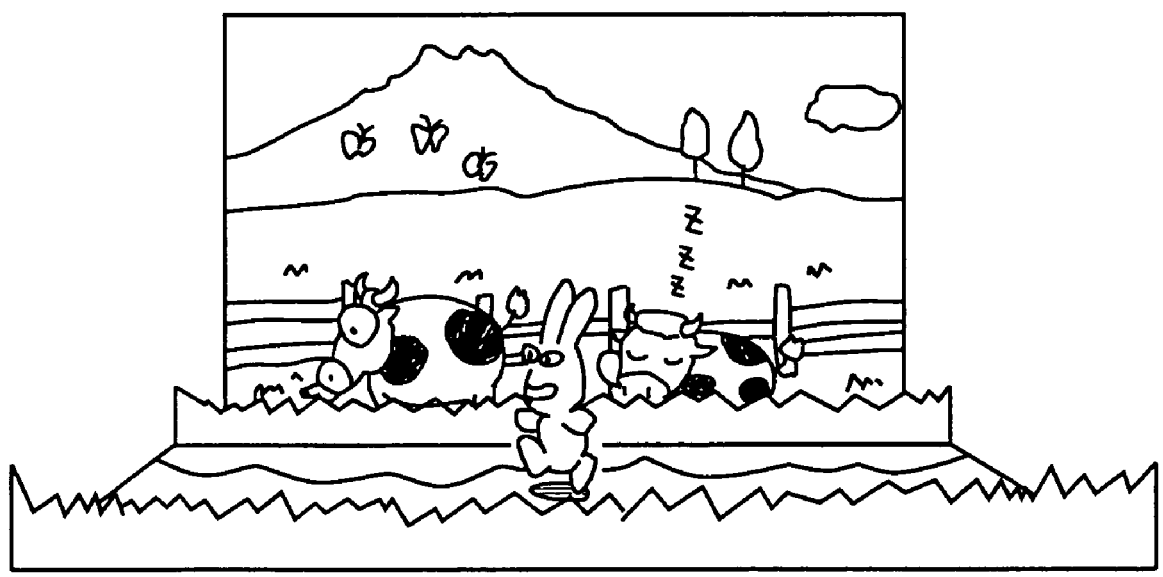
FIG. 10 is a diagram showing a specific example of a two-dimensional image of the game space shown in FIG. 8 viewed from another viewpoint.

Then, suppose the story advances and arrives at branch position B2 and branches to story b2. The viewpoint is changed to a predetermined location just to the left of the player character viewed from the player character in the moving direction. Therefore, as shown in FIG. 10, the display screen shows the player character nearly at the center, the cows behind the player character and a two-dimensional image of the pasture and mountain as the background, and story b2 advances.

Figure 11:
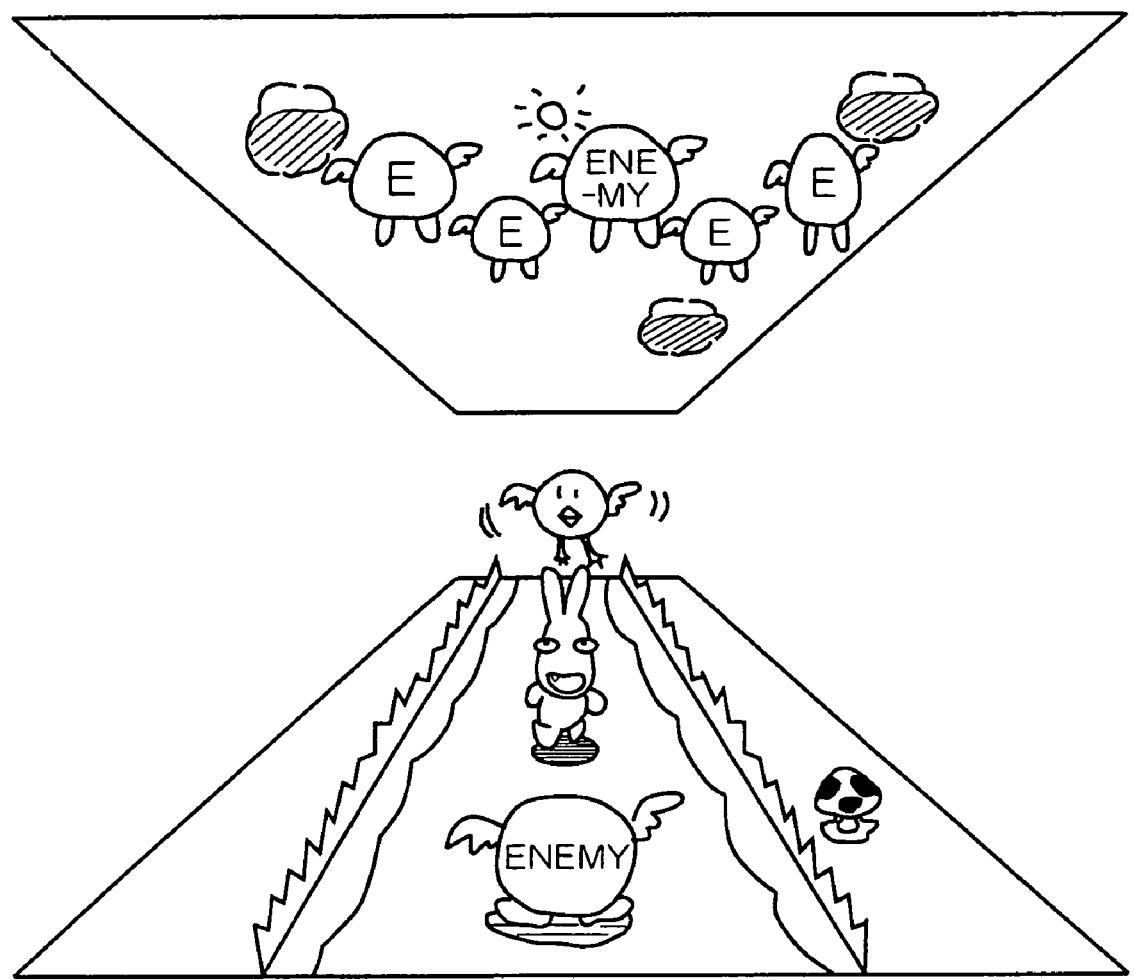
FIG. 11 is a schematic diagram of a game space implemented by switching viewpoints of two stories c1 and c2 shown in FIG. 4.

FIG. 11 shows an outline of the game space implementing two stories c1 and c2 shown in FIG. 4 by changing the viewpoint. In the game space shown in FIG. 11, suppose the player character is coming from back to front. Enemy character flying in the air is placed up in the sky over the player character viewed from the player character in the moving direction. Furthermore, an enemy character is placed on the ground in front of the player character viewed from the player character.

Figure 12:
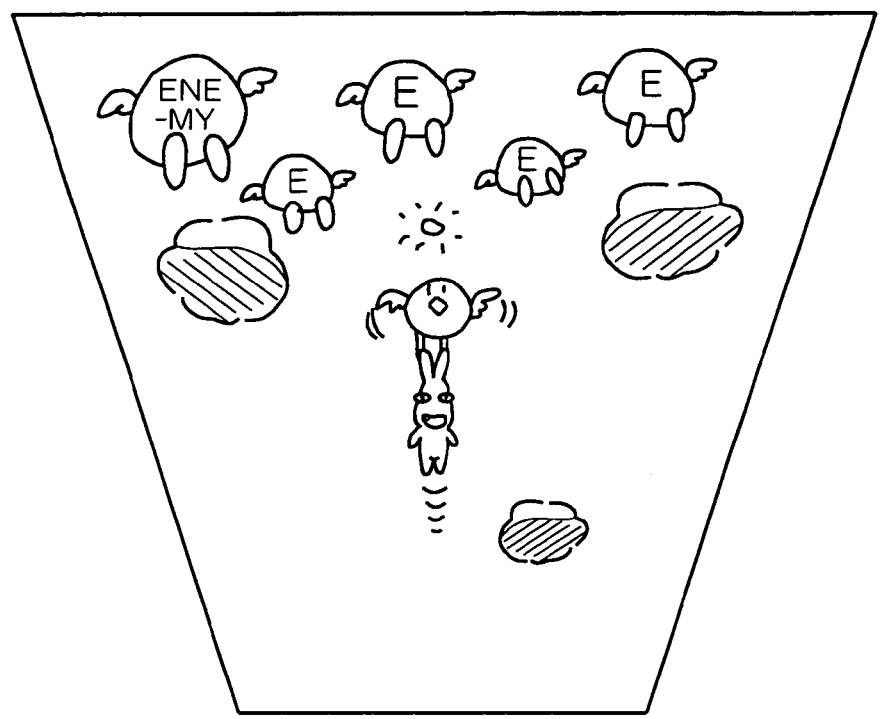
FIG. 12 is a diagram showing a specific example of a two-dimensional image of the game space shown in FIG. 11 viewed from a predetermined viewpoint.

When the story passes branch position B2 and moves in the c1 direction, the viewpoint is set at a position looking up the player character from the front bottom in the moving direction of the player character. Also in story c1, suppose an event occurs in which the player character is lifted by a friend character and flies in the air. Therefore, as shown in FIG. 12, the display screen displays a two-dimensional image showing the player character nearly at the center in the air and a plurality of floating enemy characters in front of the player character and story c1 advances in this way.

Also suppose the story advances, arrives at confluent position B3 and moves on to story c2. Then, the viewpoint is changed to a position looking down the player character from the top front in the moving direction of the player character. Therefore, as shown in FIG. 13, the display screen displays a two-dimensional image showing an enemy character at the center of the road in front of the player character in the moving direction and story c2 advances.

As shown above, even in the case where the player character moves in the same course, the game apparatus of this embodiment can display two-dimensional images with different backgrounds by changing the viewpoint. In other words, the game apparatus of this embodiment can implement a plurality of stories having different scenes using the same background data by only changing the viewpoint, thus making it possible to reduce the amount of background data to be created and alleviate effort to create background data.

Moreover, as explained using, for example, FIG. 8 to FIG. 10, the game apparatus of this embodiment can drastically change the background of the player character by differentiating three-dimensional objects included in the field of view corresponding to a plurality of viewpoints and further discretely switch the contents of two-dimensional images displayed when the viewpoint is changed. Especially, the image data need not be read every time the viewpoint is changed, making it possible to shorten the time necessary for the switching processing.

Figure 13:
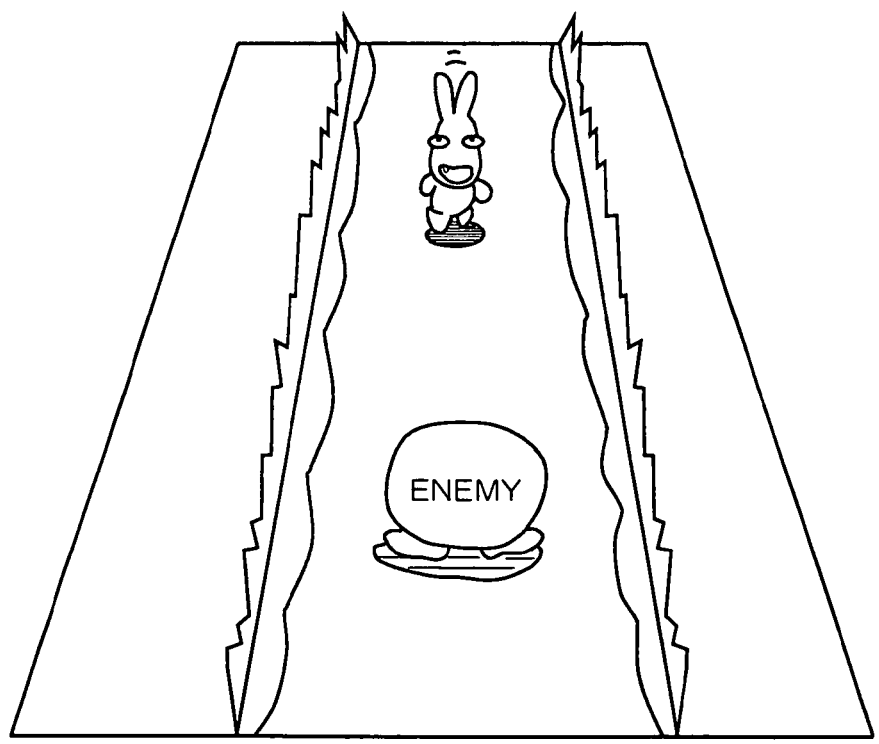
FIG. 13 is a diagram showing a specific example of a two-dimensional image of the game space shown in FIG. 11 viewed from another viewpoint.

Furthermore, as explained using, for example, FIG. 11 to FIG. 13, the game apparatus of this embodiment can implement stories of totally different contents by not only changing the viewpoint but also generating different events from one story to another. Especially, changing the level of difficulty of events generated in each story and making those stories with different level of difficulty can provide variations in the game contents. For example, as shown in FIG. 12, in the scene where the player character floats in the air, the degree of freedom in action is restricted and it is more difficult to avoid attacks from enemy characters and on top of it there are more enemy characters, thus implementing a story hard to clear the stage with a high level of difficulty. On the contrary, as shown in FIG. 13, in the scene where the player character is moving on a road, the degree of freedom in action is large and it is easier to avoid attacks from enemy characters and on top of it there is only one enemy character, thus implementing a easy story to be cleared with a low level of difficulty.

The present invention is not limited to the embodiment above, but can be modified in various ways without departing from the spirit and/or scope of the present invention. For example, the above embodiment describes the case where when the game story has branches and confluences, the viewpoint is changed according to these branches and confluences, but it is also possible to change the viewpoint regardless of the presence or absence of such branches and confluences. For example, changing the viewpoint when there is no branch can implement a simple scene change.

Furthermore, the above embodiment describes the home game apparatus, but it is also possible to apply the present invention to a game apparatus for business use installed in a game center, etc.

Furthermore, the above embodiment describes the CD-ROM 188 as the information storage medium storing a game program, but a DVD-ROM, ROM cartridge, hard disk or data cartridge using a tape medium, etc. can also be used instead. In this case, a data reading section compatible with each information storage medium can be provided instead of the disk reading section 186.

The invention claimed is:

1. A game apparatus comprising:
   movement processing unit for moving a character corresponding to a player along a predetermined course set in a three-dimensional game space plural times;
   viewpoint setting unit for setting a plurality of viewpoints in the field of view in which said character is included, at the time of moving the character along the course plural times, corresponding to each movements; and
   image preparing unit for selectively preparing two-dimensional images corresponding to said plurality of viewpoints set by said viewpoint setting unit, at the time of moving the character along the course plural times, corresponding to each movements,
   wherein three-dimensional objects corresponding to at least one of enemy characters except for the character corresponding to a player, traps and items are arranged in manner of different contents and different order in said field of view corresponding to each of a plurality of viewpoints.

2. The game apparatus according to claim 1, further comprising image data storing unit for storing image data necessary for said image preparing unit for preparing two-dimensional images corresponding to said plurality of viewpoints,
   wherein said image preparing unit selectively prepares said two-dimensional image corresponding to one of said plurality of viewpoints.

3. The game apparatus according to claim 1, further comprising viewpoint switching unit for switching said viewpoints set by said viewpoint setting unit,
   wherein a scene change is performed by discretely switching the content of said two-dimensional image prepared by said image preparing unit.

4. The game apparatus according to claim 3, further comprising branch deciding unit for deciding a story branch generated when the movement processing unit moves said character,
   wherein said viewpoint switching unit switches said viewpoint when said branch deciding unit detects said story branch.

5. The game apparatus according to claim 1, further comprising game directing unit for generating different events in accordance with said plurality of viewpoints while said movement processing unit is moving said character.

6. The game apparatus according to claim 5, wherein said game directing unit changes the level of difficulty of said events corresponding to said plurality of viewpoints.

7. The game apparatus according to claim 1, wherein said image preparing unit generates the plurality of the two-dimensional images including different contents with corresponding the common three-dimensional game space to each of the plurality of the viewpoints.

8. The game apparatus according to claim 1, wherein the three-dimensional objects corresponding to said character corresponding to a player, said enemy characters, said traps and said items are configured by polygons.

9. The game apparatus according to claim 1, wherein said image preparing unit performs perspective projection conversion based on the viewpoint set by said viewpoint setting unit to said three-dimensional objects and generates said two-dimensional images.

10. A game image preparation method, comprising:
    a first step of moving a character corresponding to a player along a predetermined course set in a three-dimensional game space plural times;
    a second step of setting a plurality of viewpoints in the field of view in which said character is included when said character moves along the course plural times in said first step, corresponding to each movements; and
    a third step of preparing two-dimensional images corresponding to said plurality of viewpoints set in said second step when said character moves along the course plural times in said first step, corresponding to each movements.

11. A computer readable storage medium, comprising:
    a program for moving a character corresponding to a player along a predetermined course set in a three-dimensional game space plural times and setting a plurality of different viewpoints in the field of view in which said character is included, corresponding to each movements; and
    a program for preparing two-dimensional images corresponding to said plurality of viewpoints.

* * * * *